UNITED STATES PATENT OFFICE.

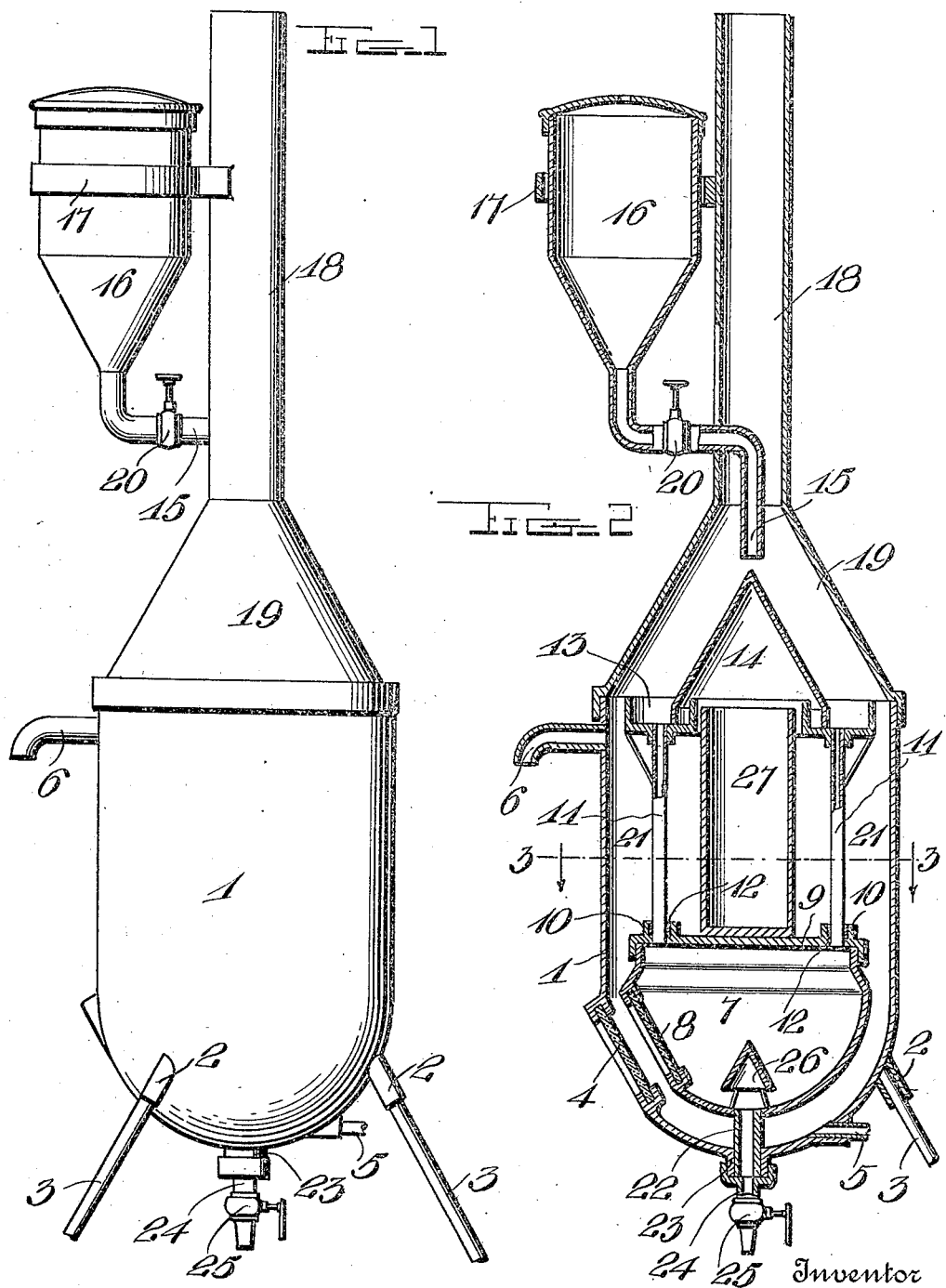

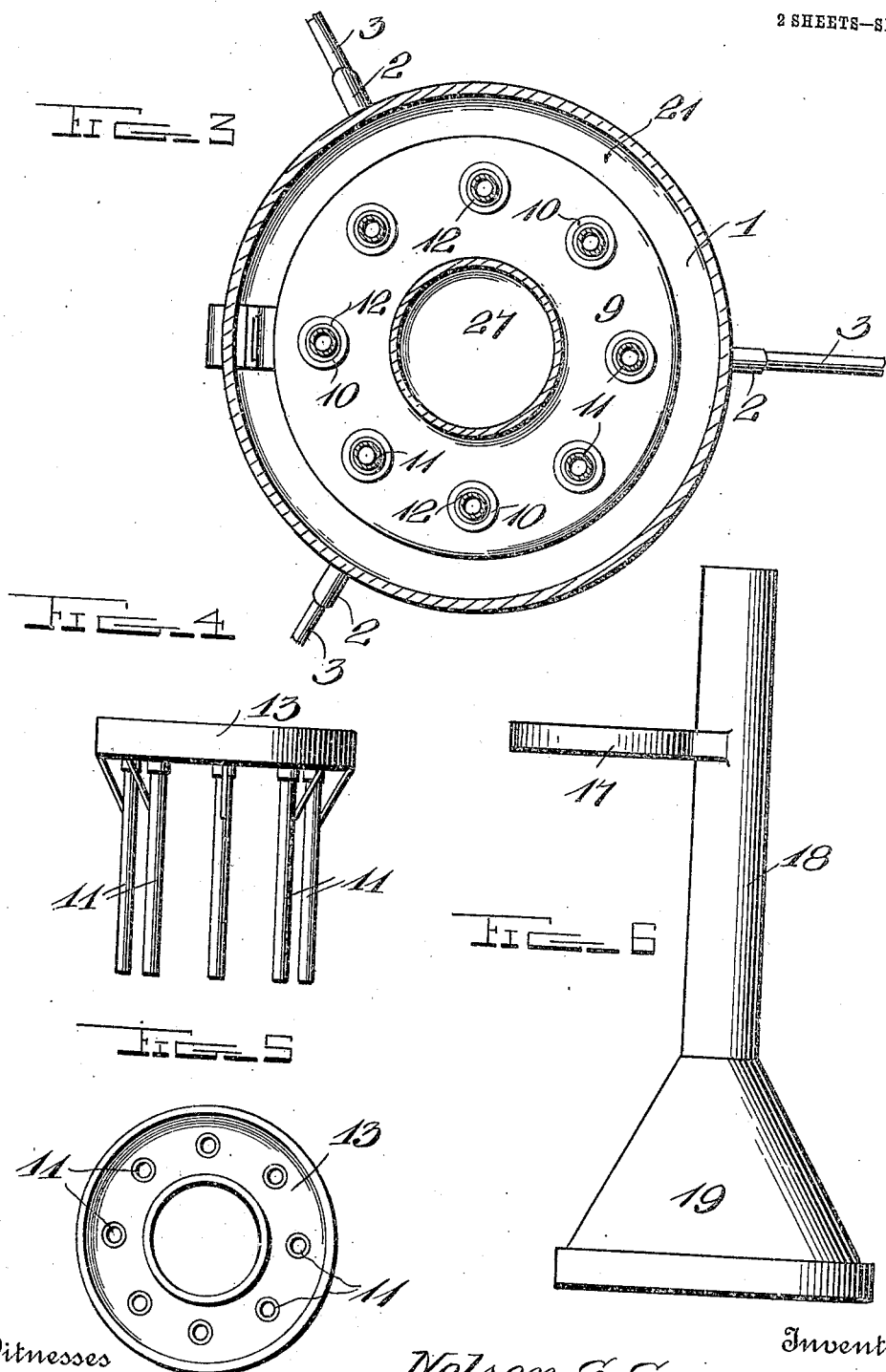

NELSON S. SPRAGUE, OF CHANDLER, OKLAHOMA, ASSIGNOR OF ONE-HALF TO CHAS. N. SHELTON, OF AGRA, OKLAHOMA.

CREAM-SEPARATOR.

952,220.  Specification of Letters Patent.  Patented Mar. 15, 1910.

Application filed September 23, 1909. Serial No. 519,176.

*To all whom it may concern:*

Be it known that I, NELSON S. SPRAGUE, a citizen of the United States, residing at Chandler, in the county of Lincoln and State of Oklahoma, have invented certain new and useful Improvements in Cream-Separators; and I do declare the following to be a full, clear, and exact description of the invention, such as will enable others skilled in the art to which it appertains to make and use the same.

My invention relates to cream separators.

The object of the invention is to provide a simple, cheap and efficient separator which will expedite the separation of the milk without requiring applied power to separate the cream from the milk by their difference in specific gravity, and one which will be sanitary in every respect.

With the foregoing and other objects in view, the invention consists of certain novel features of construction, combination and arrangement of parts, as will be more fully described and particularly pointed out in the appended claims.

In the accompanying drawings, Figure 1 is a side elevation of the device as it is used; Fig. 2 is a vertical sectional view; Fig. 3 is a detail perspective view of the milk receiving pan and its associated tubes; Fig. 4 is an enlarged detail sectional view of the separating reservoir; Fig. 5 is a detail perspective view of the venting top with the milk tank removed; Fig. 6 is a side elevation of the top and venting tube removed as a unit from the separator.

Referring more especially to the drawings, 1 represents the casing which, in this instance, is shown as provided with three spaced tubes 2 extending from its bottom adapted to receive the supporting legs 3. This casing is substantially round at its bottom and is provided with a sight glass 4 graduated, as shown, so that the amount of milk and cream within the separating reservoir may be determined as will be hereinafter described. This casing has a water inlet at 5 and a suitable outlet at 6, whereby a circulation of water may be kept up within the casing so as to keep the milk being treated at a predetermined temperature. Mounted within the casing and separated therefrom, is a suitable separating reservoir 7 having a bottom conforming to the outline of the bottom of the casing 1 and having a sight glass 8 arranged adjacent the sight glass 4 and graduated in a similar manner, for a purpose as above described.

The separating reservoir is provided with a top 9 which has extending upwardly therefrom the tubes 10, upon which are mounted the milk conducting tubes 11. These tubes, as shown, are provided with a bushing 12 of rubber or other suitable material which fits tightly around the tubes 10 and prevents the water in the casing from entering the separating reservoir. These tubes 11 are connected directly to a receiving pan 13 which is annular in form and which is adapted to receive the milk from the cone 14. This cone is seated within the annular pan 13 and is adapted to receive the milk from the discharge tube 15 and spread the same over the surface, whereby it is properly aerated before entering the tubes 11. The discharge tube 15 leads from a milk receiving tank 16 supported in the collar 17 carried upon the venting pipe 18, which forms an extension of the cone-shaped top 19. The top is supported concentrically of the cone 14 upon the upper edge of the casing 1 and holds the discharge pipe 15 immediately above the apex of the cone 14. A suitable valve 20 regulates the discharge of the milk from the tank 16.

Extending from the lower end of the reservoir 7 and passing through the water space 21, formed between the reservoir and the lower end of the casing, is a discharge tube 22 which passes through a bushed collar 23 on the lower end of the casing. A suitable extension 24 of the cover is provided with a valve 25, by which the discharge of the milk in the reservoir may be controlled. Immediately above the outlet of the pipe 22 and within the reservoir 7, I provide a V-shaped guard 26 which prevents the milk from swirling and thus mingling with the cream after separation.

The top 9 on the reservoir 7 forms a table upon which there is supported a storage tank 27, whose upper end is arranged within the center of the annular pan 13 and is above the water level.

In operation, the valve 20 is opened a predetermined degree so as to permit a certain quantity of milk to flow through the discharge tube 15 over the cone 14 into the tank 13. The milk flows from the pan 13 through the cooling tubes 11 into the separating reservoir, the cream being properly formed when permitted to rest in the separating reservoir, separates in short order and the milk after separation from the cream may be drawn off, the operation being watched through the sight glasses 4 and 8 until the whole amount of milk has been drawn off, when the valve 25 is closed and a separate receptacle placed under the discharge nozzle 24 and the cream allowed to flow thereinto. It will be noticed that all of the parts are movably arranged and that the cooling tubes are adapted to be readily disconnected from the top 9 and the top of the receptacle or reservoir 7, also that the cone is readily disengaged from the pan 13 and the top and venting tube from the casing so that all of the parts may be disassembled for cleaning purposes.

From the foregoing description, taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of the invention, as defined in the appended claims.

Having thus described my invention, what I claim is:

1. A cream separator comprising a milk tank, an aerating device adapted to receive the milk from said tank, a cooling device removably connected to the aerating device, and a separating reservoir removably connected to the cooling device.

2. A cream separator comprising a milk receiving tank, an aerating device adapted to receive the milk from the receiving tank, a casing, means to supply a cooling element to the casing, a plurality of tubes passing through the cooling element and adapted to receive the milk from the aerating device, and a separating receptacle adapted to receive the milk from the tubes.

3. A cream separator comprising a casing, a cooling element passing through said casing, a venting top carried by the casing, a milk tank carried by the top, and means to assist in the separation of the milk arranged in the tank to be acted upon by the cooling element and adapted to receive the milk from the milk tank.

4. A cream separator comprising a casing, means within the casing for separating the milk, a cone-shaped cap mounted on the casing, a venting tube carried by the cap, a milk tank carried by the venting tube and a cone-shaped aerating device carried by the separating means within the cap and adapted to receive the milk from said tank.

In testimony whereof I have hereunto set my hand in presence of two subscribing witnesses.

NELSON S. SPRAGUE.

Witnesses:
ISAAC C. PIERCE,
CHARLES N. SHELTON.